United States Patent
Bouldin et al.

(10) Patent No.: US 11,371,623 B2
(45) Date of Patent: Jun. 28, 2022

(54) MECHANISMS AND METHODS FOR CLOSURE OF A FLOW CONTROL DEVICE

(71) Applicant: Saudi Arabian Oil Company, Dhahran (SA)

(72) Inventors: Brett Bouldin, Dhahran (SA);
Kenechukwu Ufondu, Dhahran (SA);
Robert Turner, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 315 days.

(21) Appl. No.: 16/575,014

(22) Filed: Sep. 18, 2019

(65) Prior Publication Data

US 2021/0080019 A1 Mar. 18, 2021

(51) Int. Cl.
| | |
|---|---|
| *F16K 17/38* | (2006.01) |
| *E21B 34/08* | (2006.01) |
| *F16K 31/00* | (2006.01) |
| *E21B 17/18* | (2006.01) |
| *E21B 34/06* | (2006.01) |
| *E21B 43/08* | (2006.01) |
| *E21B 43/12* | (2006.01) |

(52) U.S. Cl.
CPC ........... *F16K 17/383* (2013.01); *E21B 34/08* (2013.01); *F16K 31/002* (2013.01); *E21B 17/18* (2013.01); *E21B 34/063* (2013.01); *E21B 43/08* (2013.01); *E21B 43/12* (2013.01)

(58) Field of Classification Search
CPC ........ E21B 34/08; E21B 17/18; E21B 34/063; E21B 43/08; E21B 43/01; F16K 31/002
USPC .......................................................... 137/72
See application file for complete search history.

(56) References Cited

U.S. PATENT DOCUMENTS

| | | | |
|---|---|---|---|
| 1,284,682 A | 11/1918 | Holt | |
| 3,791,450 A | 2/1974 | Poitras | |
| 4,442,756 A | 4/1984 | Goans | |
| 4,612,959 A * | 9/1986 | Costello | ................. F16K 13/10 |
| | | | 137/251.1 |
| 4,949,742 A * | 8/1990 | Rando | ................... F16K 31/002 |
| | | | 137/13 |

(Continued)

FOREIGN PATENT DOCUMENTS

| | | |
|---|---|---|
| CA | 2828241 | 3/2015 |
| EP | 0456484 | 11/1991 |
| WO | 2013145777 A1 | 10/2013 |

OTHER PUBLICATIONS

International Search Report and Written Opinion in Corresponding PCT Application No. PCT/US2020/050662 dated Dec. 15, 2020. 12 pages.

*Primary Examiner* — P. Macade Nichols

(74) *Attorney, Agent, or Firm* — Leason Ellis LLP

(57) ABSTRACT

A closure mechanism and a method for plugging a flow control device of a well is provided. The closure mechanism includes a switch having a hollow interior and a U-shaped portion. The closure mechanism also includes a metal insert located within a portion of the hollow interior of the switch. The mechanism further includes a heating device positioned within the well. In the method, the heating device is activated in the well and melts at least a portion of the metal insert. The melted portion of the metal insert collects and re-solidifies within the U-shaped portion of the switch, thereby closing the switch and plugging the flow control device against flow.

17 Claims, 12 Drawing Sheets

(56) References Cited

U.S. PATENT DOCUMENTS

| | | | |
|---|---|---|---|
| 5,419,357 A * | 5/1995 | Lhymn | G05D 23/021 |
| | | | 428/614 |
| 5,743,285 A | 4/1998 | Shalkevich | |
| 6,152,167 A | 11/2000 | Baker | |
| 6,439,315 B2 | 8/2002 | Onuki | |
| 7,409,999 B2 | 8/2008 | Henriksen | |
| 7,419,002 B2 | 9/2008 | Reslink | |
| 7,640,965 B2 | 1/2010 | Bosma et al. | |
| 7,828,067 B2 | 11/2010 | Scott | |
| 8,047,298 B2 | 11/2011 | Solhaug et al. | |
| 9,617,921 B2 | 4/2017 | Biyani et al. | |
| 9,845,659 B2 | 12/2017 | Madell et al. | |
| 2006/0157257 A1 | 7/2006 | Ross et al. | |
| 2008/0289695 A1 | 11/2008 | Holzer | |
| 2019/0003282 A1 | 1/2019 | Doherty | |
| 2019/0055823 A1 | 2/2019 | Koli et al. | |

\* cited by examiner

MECHANISMS AND METHODS FOR CLOSURE OF A FLOW CONTROL DEVICE

TECHNICAL FIELD

The present disclosure is related to devices and methods for closing valves in oil and gas wells. In particular, the present disclosure is related to devices and methods for closing flow control devices via the heating of low melting point metals.

BACKGROUND OF THE DISCLOSURE

Sand screens and inflow control devices (ICDs) are commonly used as flow control tools in oil and gas wells. A sand screen is a device used for sand production control (gravel packing) and general solids protection. Since gravel packs can be installed in multiple sections, the need to close off sections with intervention has become more popular. Sometimes sections of gravel packs need to be shut off because undesired fluids such as water or gas are produced it that section.

An ICD is a device that can be installed as part of a well completion to improve production by equalizing reservoir inflow along the length of the wellbore. ICDs are typically used in combination with swell or mechanical open-hole packers to divide the wellbore into many segments and attempt to force the well to produce with uniform flux. This is generally resisted since formations are heterogeneous with differing permeabilities. In a horizontal well, water or gas tends to break through in the part of the well having the highest permeability. Once this happens, much of the remaining oil in the lower permeability rock is left behind. If the influx can be controlled and balanced (e.g., via the ICD), water and gas breakthrough will occur much later, after a higher percentage of the low perm oil is produced. Each ICD can comprise a screen, base pipe, and a fixed orifice.

Because sand screens, ICDs, and other flow control devices control the flow of undesired fluids, there is a need to mechanically close any segments that are producing these undesired fluids. If the undesired fluids are adequately controlled, an even higher percentage of oil can be produced by a given oil well. As such, shut-off mechanisms for sand screens and ICDs have been developed.

For example, a shut-off mechanism that is conventionally used is a sliding sleeve similar to those used in sliding sleeve tools or sliding side door-style downhole devices. A sliding sleeve tool is generally an annular-shaped valve with a concentric sleeve used to open and close the valve by axially manipulating the sleeve up and down. The sleeve can be manipulated with a shifting tool run inside the production tubing on slickline, electric line, or coiled tubing. Such an operation where a rig is not required is called an intervention. Interventions are preferred because they are quicker and cheaper than bringing a drilling or workover rig to the wellsite location.

Many sand screens and ICDs on the market in recent years have been designed with closure sleeves. These sliding-style sleeves are exposed to the flowing wellbore environment for the life of the tools. However, closure sleeves can become fouled by debris, asphaltenes, paraffins, scale, or corrosion for example, and thus they become less reliable the longer they are in the well.

Accordingly, there is a need for shut-off valves that are effective at closing off sections to undesired fluids but can better withstand the corrosive environments of a wellbore. The present application address these and other needs.

SUMMARY OF THE DISCLOSURE

In a first aspect, a closure mechanism for plugging a flow control device of a well is provided. The closure mechanism includes a switch in fluid communication with a portion of the flow control device. The switch has a hollow interior and a U-shaped portion. The closure mechanism also includes a metal insert located within a portion of the hollow interior of the switch. The closure mechanism further includes a heating device positioned within the well. Activation of the heating device melts at least a portion of the metal insert and the melted portion of the metal insert then collects and re-solidifies within the U-shaped portion of the switch, thereby closing the switch and plugging the flow control device against flow.

In another aspect, the switch is a valve. In a further aspect, the closure mechanism also includes a hollow pipe of the flow control device or the well, where at least a portion of the valve is a coil-shaped tube configured to wrap around the hollow pipe. In a further aspect, the hollow pipe has a horizontal orientation and the coil-shaped tube of the valve is a coiled at least 1.5 turns around the hollow pipe.

In another aspect, the heating device is a thermite heater.

In at least one aspect, the metal insert is a eutectic metal insert and the switch is comprised of metal having a higher melting temperature than the eutectic metal insert. In another aspect, the metal insert is a metal rod. In another aspect, the metal insert is a metal lining that is coated on a lower portion of the hollow interior of the switch. In another aspect, the metal insert is a metal lining that is coated on the entire hollow interior of the switch.

In a second aspect, a method for plugging a flow control device of a well is provided, where the flow control device is in fluid communication with a switch and the switch has a hollow interior with a metal insert and a U-shaped section. In the method, a heating device is positioned in the well. The heating device is then activated, where the activated heating device melts a portion of the metal insert inside the switch. The melted portion of the metal insert then collects in the U-shaped portion of the switch and re-solidifies in the U-shaped portion of the switch, thereby closing the switch and plugging the flow control device against flow.

In another aspect, at least a portion of the switch is wrapped around a hollow pipe of the well, where the portion of the switch is wrapped at least 1.5 turns around the hollow pipe to form the coil-shaped section and where the coil-shaped section comprises the U-shaped portion. In a further aspect, the switch is a valve comprising metal, and the metal insert is a eutectic metal insert. In a further aspect, the heating device is positioned into the hollow pipe at a location that is adjacent to the coil-shaped section, and the coil-shaped section is heated, via activation of the heating device, to a temperature such that a portion of the metal insert melts but the metal of the valve does not melt.

In a third aspect, a closure mechanism for plugging a flow control device a well is provided. The closure mechanism includes a switch that has a hollow interior and is in fluid connection with a portion of the flow control device. The switch includes an inlet section and an outlet section. The switch also includes a collection section that connects the inlet and outlet sections, where the collection section is positioned below the inlet and outlet sections. The switch also includes a metal insert that lines at least a portion of the hollow interior of the switch. The closure mechanism further includes a heating device that is positioned adjacent to the collection section. Activation of the heating device melts the metal insert. As such, at least a first portion of the melted metal insert collects and re-solidifies in the collection section thereby closing the switch and plugging the flow control device against flow.

In another aspect, the metal insert is a eutectic metal insert and the switch is comprised of a metal having a higher melting temperature than the eutectic metal insert. In another aspect, the metal insert is a metal rod or a metal lining that is coated on at least a lower portion of the hollow interior of the switch.

In another aspect, the collection section is a U-tube shaped section or a coil-shaped section.

In another aspect, a second portion of the melted metal insert collects and re-solidifies in the outlet section due to a pressure difference between the inlet section and the outlet section.

In another aspect, the heating device remains separated from the inlet and outlet sections. In another aspect, the inlet section and the outlet section are positioned along a horizontal plane and the collection portion is positioned along a vertical plane that is substantial perpendicular to the horizontal plane.

BRIEF DESCRIPTION OF THE DRAWING FIGURES

DETAILED DESCRIPTION OF CERTAIN EMBODIMENTS

Figure 1:
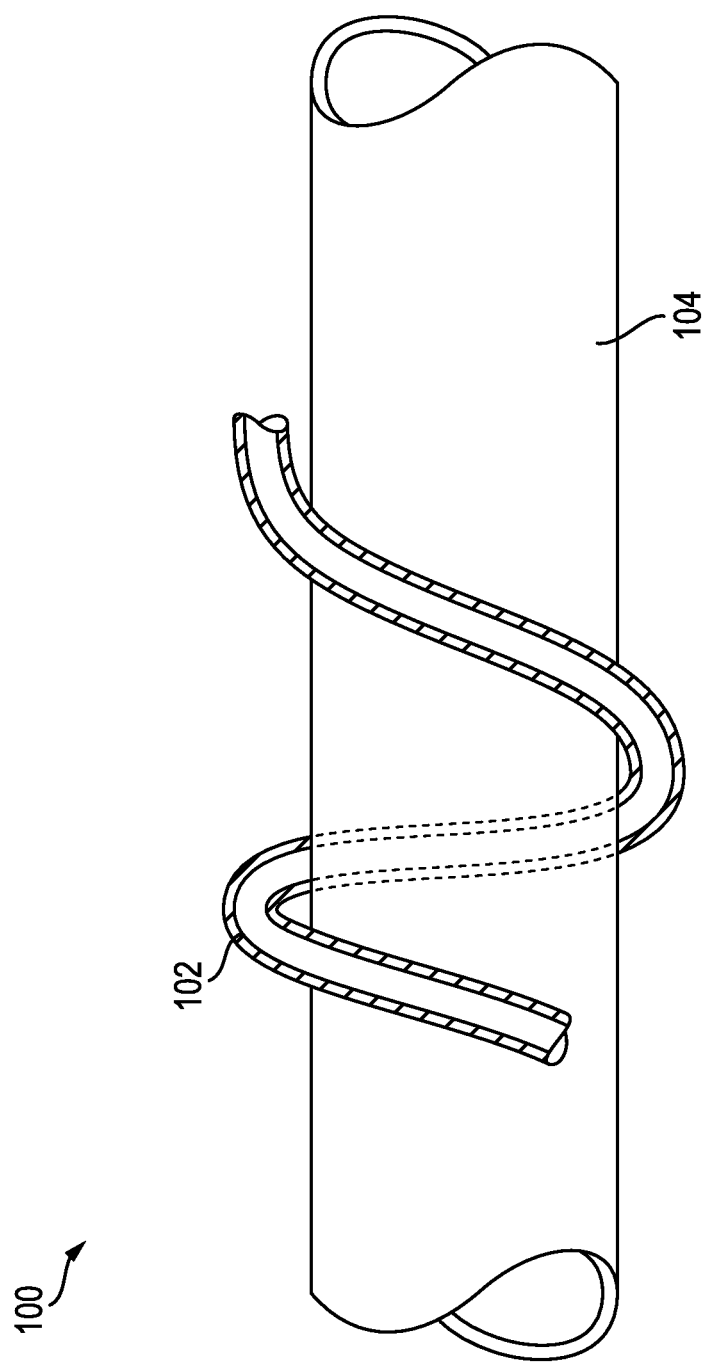
FIG. 1 shows an exemplary closure mechanism in accordance with one or more embodiments.

By way of overview and introduction, the present application discloses closure mechanisms for a flow control device and methods for closing a valve of a flow control device of an oil or gas well in accordance with one or more embodiments. In at least one embodiment, the closure mechanism is used to plug (shut-off) a sand screen, ICD or other type of flow control device. The closure mechanism can include a hollow pipe that is part of the sand screen or ICD or another portion of the oil or gas well. The closure mechanism can also include a metal valve that connects at least two sections of the sand screen or ICD. In certain embodiments, the metal valve can be a coil-shaped tube having a hollow interior and a U-shaped portion. The metal valve can be configured to fit securely around the hollow pipe.

The closure mechanism can also include a metal insert that lines a portion of the hollow interior of the valve. The metal insert is a low-melting-point metal (e.g., eutectic metal) that can be assembled outside the well flowing environment. The melting point of the metal insert is lower than the melting point of the metal valve. The low-melting-point metal is extremely corrosion resistant and is able to withstand as much as 100 years or more of exposure to normally corrosive environments.

The closure mechanism can further include a heating device that fits within the hollow pipe. The heating device can be selectively activated within the hollow pipe at a location adjacent to the U-shaped portion of the coil-shaped metal valve. Activation of the heating device causes a portion of the low-melting-point metal insert in and around the U-shaped portion to melt. The melted metal insert then collects within the U-shaped portion by way of gravity and re-solidifies within the U-shaped portion. As such, the coil-shaped metal valve is plugged with there-solidified metal insert thereby preventing flow between the two sections of the sand screen or ICD. The closure mechanism of the present application does not include any sliding surfaces, and thus does not become fouled by debris, asphaltenes, paraffins, scale, or corrosion.

Thus, the present application discloses a closure mechanism (heat-sensitive pressure shut-off mechanism) for a flow control device in oil and gas wells. The low-melting-point metal insert can be a eutectic metal, which is a low temperature melting point alloy that is structurally sound at low temperatures and completely liquid at moderately higher temperatures. Thus, the present method and closure mechanism can be used as a thermally-sensitive valve to shut-off or stop production of undesired fluids through sand screens and ICDs. Thermite can be used as the heating device to activate the valve. Such an actuator can survive for long periods of time in the wellbore without degradation and, thus allows for a shut-off mechanism that is inexpensive, reliable, and can be activated whenever demanded.

These and other aspects of the closure mechanisms and the methods of closing the valve are described in further detail below with reference to the accompany drawing figures, in which one or more illustrated embodiments and/or arrangements of the closure mechanisms and methods are shown. The closure mechanisms and methods of the present application are not limited in any way to the illustrated embodiment and/or arrangement. It should be understood that the mechanisms and methods as shown in the accompanying figures are merely exemplary of the mechanisms and methods of the present application, which can be embodied in various forms as appreciated by one skilled in the art. Therefore, it is to be understood that any structural and functional details disclosed herein are not to be interpreted as limiting the mechanisms and methods, but rather are provided as a representative embodiment and/or arrangement for teaching one skilled in the art one or more ways to implement the present mechanisms and methods.

FIG. 1 displays an exemplary closure mechanism 100 in accordance with one or more embodiments. As shown in FIG. 1, in one or more embodiments, the closure mechanism includes a metal valve 102. The metal valve 102 can be a metal tubing that connects at least two sections of a flow control device (e.g., sand screen, inflow control device). As such, the metal valve 102 when open can allow the flow of fluid from one end of the valve (inlet) to the other end of the valve (outlet). The metal valve 102 is generally made of a high-melting-point metal material. For example, the metal valve can comprise at least one of 316 stainless steel (316 SS), 13% Cr stainless steel (13Cr), 25% Cr stainless steel (25Cr), alloy 825 (e.g., INCONEL 825), alloy 718 (e.g., INCONEL 718), alloy 725 (e.g., INCONEL 725), and a nickel-cobalt based alloy (e.g., MP35N alloy). In one or more embodiments, as exemplified in FIG. 1, the metal valve 102 can be coiled securely around a portion of a hollow pipe 104 that is part of the flow control device (e.g., sand screen, ICD) or the oil or gas well.

Figure 2B:
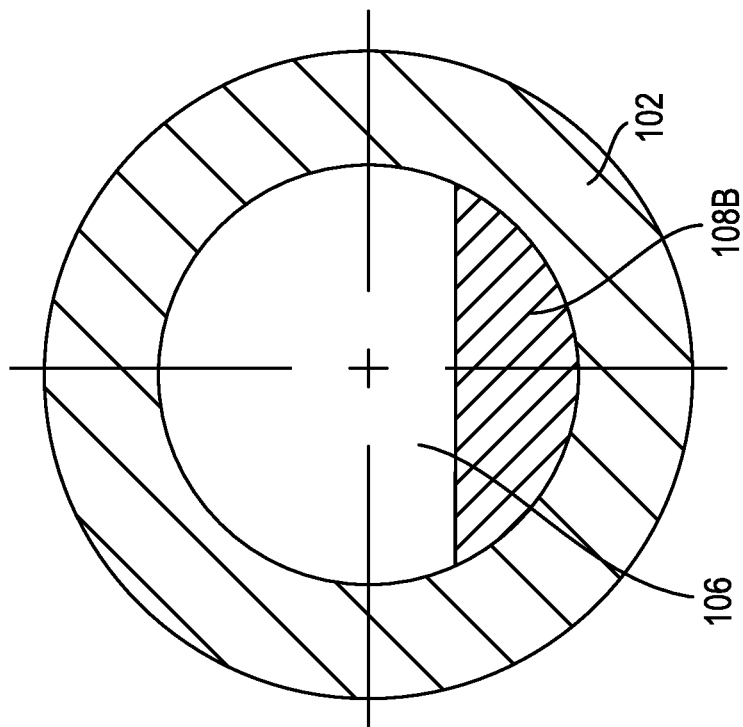
FIGS. 2A-2C show exemplary implementations of a metal valve and a metal insert of the closure mechanism in accordance with one or more embodiments.
Figure 2A:
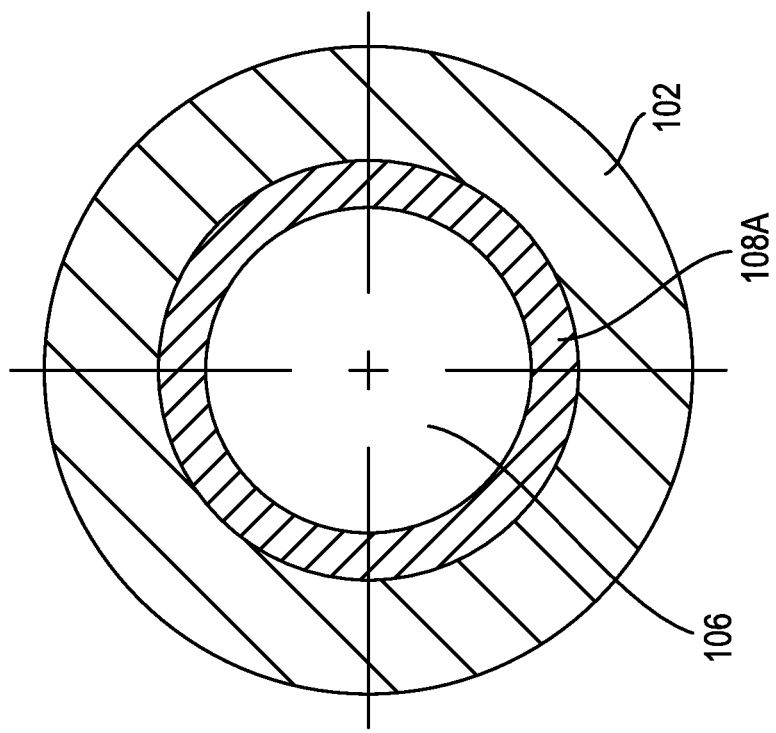
Figure 2C:
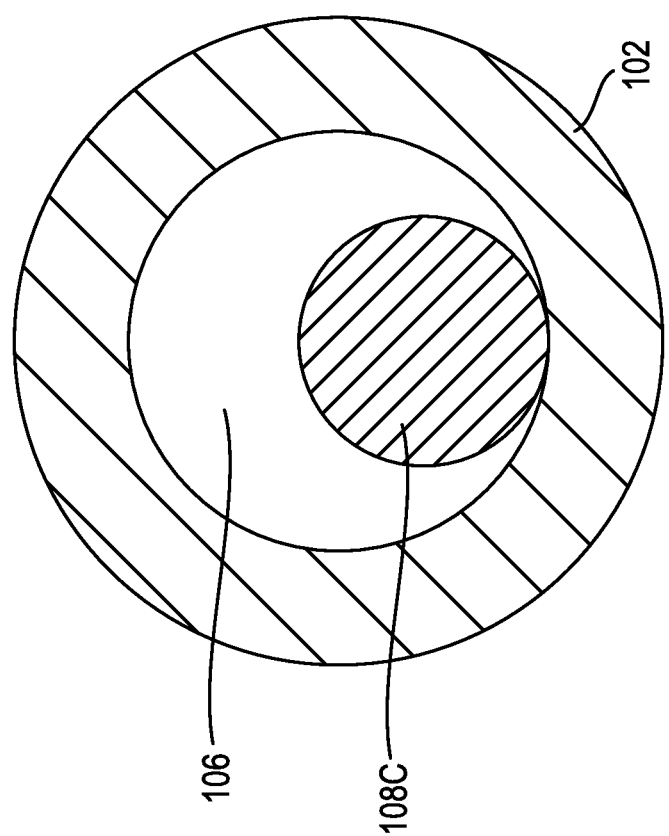

FIGS. 2A-2C show various embodiments of the metal valve 102. As shown in FIGS. 2A-2C, the metal valve 102 can have a hollow interior 106 that includes a metal insert 108 (108A, 108B, 108C). As mentioned above, the metal insert can 108 (108A, 108B, 108C) can be made of a low-melting-point material such as a eutectic metal. Eutectic metals are generally low temperature melting point alloys that are structurally sound at low temperatures but can be completely liquefied at moderately higher temperatures. For example, the eutectic metal can be a bismuth-tin alloy, such as those utilized by BiSN TEC LTD. Bismuth-tin alloys are extremely corrosion resistant and can withstand approximately 100 years of exposure to normally corrosive environments. In one or more embodiments, one or more additional alloying elements can be added to the bismuth-tin alloy to adjust the melting point of the low-melting-point material. In one or more embodiments, the eutectic metal comprise at least one of a tin-lead (Sn—Pb) alloy, an aluminum-silicon (Al—Si) alloy, and a sodium-potassium (NaK) alloy. In one or more embodiments, the melting temperature of the low-melting-point material (e.g., eutectic metal) is 40-50° C. above the highest expected well temperature.

In one or more embodiments, as shown in FIGS. 2A and 2B, the metal insert 108A, 108B can coat or line at least a portion of the hollow interior 106 of the metal valve 102. For instance, as shown in FIG. 2A, the metal insert 108A can coat the entire inner circumferential area of at least a portion of the hollow interior 106 of the valve 102. In at least one embodiment, as shown in FIG. 2B, the metal insert 108B can coat a bottom area (e.g., bottom half) of at least a portion of the hollow interior 106 of the valve 102. In one or more embodiments, as shown in FIG. 2C, the metal insert 108C can be a metal rod, such as a cast rod, that is inserted into at least a portion of the hollow interior 106 of the valve 102. The metal rod can be one continuous rod or several short length rods inserted in the hollow interior of the valve 102.

Figure 3:
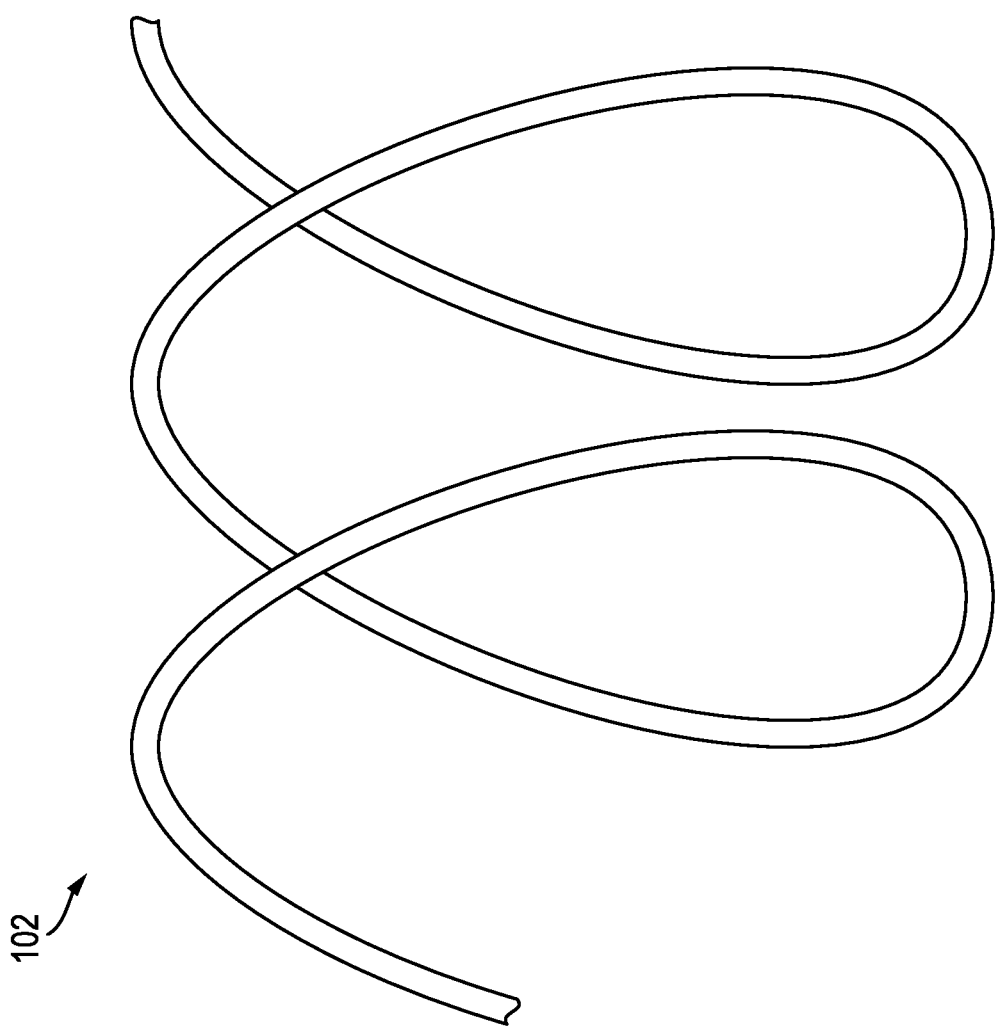
FIG. 3 shows an exemplary coiled shape of the metal valve of the closure mechanism in accordance with one or more embodiments.

Once the metal insert 108 (108A, 108B, 108C) is inserted into the hollow interior 106 of the metal valve 102, the metal valve 102 can be manipulated in to a coil shape as needed. FIG. 3 shows an exemplary coiled shape of the metal valve 108. In one or more embodiments, the metal valve is coiled at least 1.5 turns about a pipe.

Figure 4:
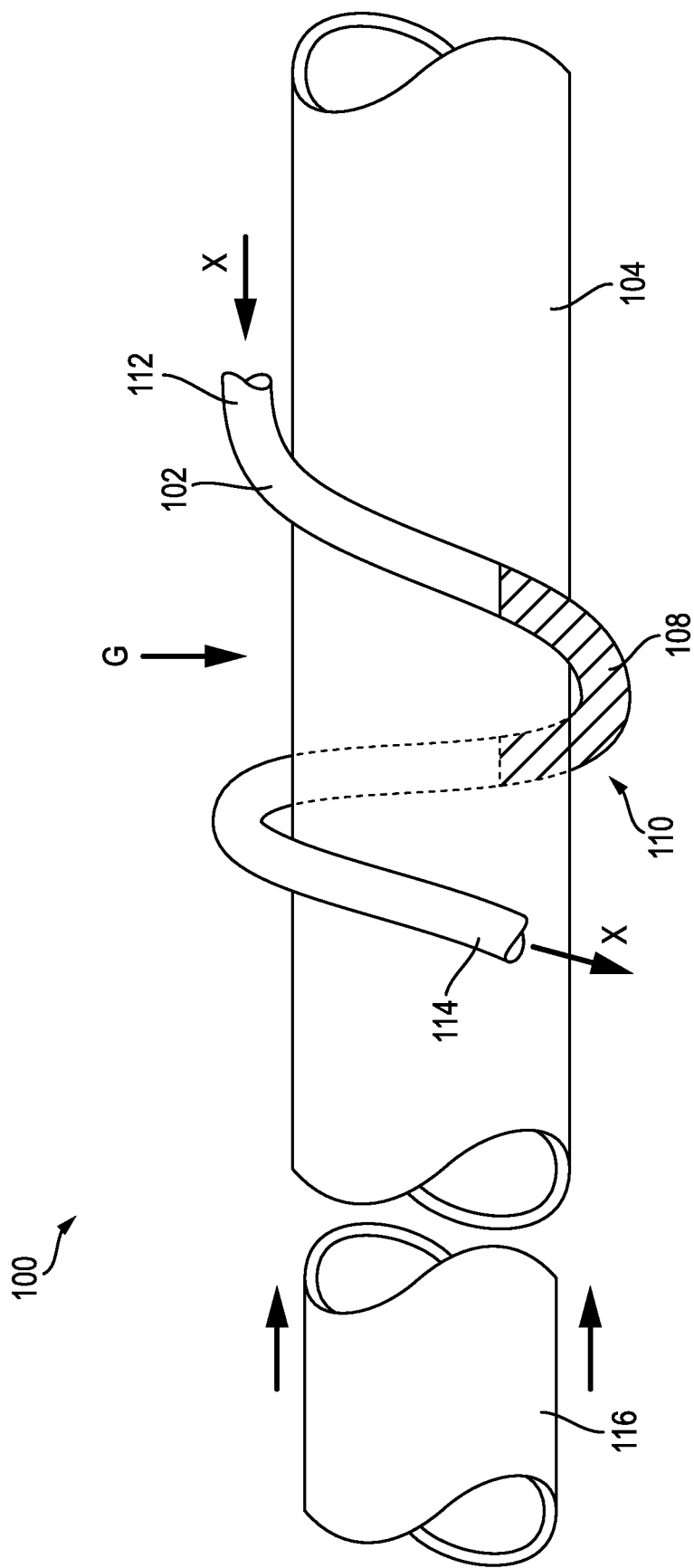
FIG. 4 shows an exemplary closure mechanism after activation with a heating device in accordance with one or more embodiments.

As shown in FIG. 4, in one or more embodiments, a portion of the metal valve 102 is coiled about a hollow pipe 104, where the hollow pipe 104 is in a substantially horizontal configuration. In one or more embodiments, the oil or gas well that the closure mechanism 100 is used in is a horizontal well (90 degrees deviation). In one or more embodiments, the closure mechanism 100 is used in a deviated well that can be deviated in the range of 45 degrees to less the 90 degrees from vertical. In certain embodiments in which the closure mechanism 100 is used in a deviated well, the metal valve 108 needs to be coiled more than 1.5 turns about a pipe to ensure effectiveness of the mechanism. A low portion of the valve 102 that is adjacent to the bottom side of the pipe (e.g., the lowest portion of the coil-shaped section) is referred to as the U-shaped portion 110. The valve also includes an inlet section 112 and an outlet section 114. A heater (heating device) 116 can be inserted inside the hollow pipe 104 to a location adjacent to the U-shaped portion 110. In one or more embodiments, the heater 116 is activated at the location adjacent to the U-shaped portion 110 such that the temperature in the hollow pipe 104 around the heater 116 is raised to a certain temperature range. In one or more embodiments, the heater 116 can be a thermite heater or an electric heater. For example, in at least one embodiment, the heater can be a thermite heater produced by BiSN Technologies Ltd.

The heat from the activated heater 116 emanates through the hollow pipe to the U-shaped portion 110 of the valve 102. The elevated temperature of the hollow pipe 104 is sufficient to melt the low-melting temperature metal insert 108 within the U-shaped section 110, but not high enough to melt the exterior metal of the metal valve 102. In one or more embodiments, the melting point of the low-melting temperature metal insert 108 is in the range of approximately 180° C.-300° C. As the metal insert 108 in the U-shaped portion 110 melts into liquid form, it flows via gravity towards the lowest point of the U-shaped portion 110 where it collects.

In the embodiment exemplified in FIG. 4, the oil or gas well is a horizontal well, or alternatively the portion of the well in which the closure mechanism 100 is used is substantially horizontal. The horizontal orientation of the well and the hollow pipe 104 allows the valve 102 to be coiled around the hollow pipe 104 about a horizontal axis such that when the metal insert 108 melts, gravity causes the melted metal insert 108 to flow to the bottom of the U-shaped portion 110 of the valve 102. It should be note that as long as the heater is not activated and the temperature around to metal insert 108 remains below the melting point of the insert 108, the metal insert 108 will remain stable in a solid state. However, once the metal insert 108 experiences heat at or above its melting point, the low-melting point metal will immediately melt, become liquid, and flow to the U-shaped portion 110.

Once the metal insert 108 has been melted, the heater 116 can be deactivated and/or removed from the hollow pipe 104 such that the temperature in the U-shaped portion 110 begins to decrease. As shown in FIG. 4, as the temperature in the U-shaped portion 110 decrease, the melted metal insert 108 re-solidifies in the U-shaped portion 110, thereby plugging the valve 102 and closing the valve 102 from flow. By re-solidifying in the U-shaped portion, the metal insert 108 effectively shuts off flow between the connected two sections of a flow control device (e.g., sand screen, inflow control device). In other words, the re-solidified metal insert 108 shuts off the flow between the inlet 112 of the valve 102—which connects to a first section of the flow control device—and the outlet 114 of the valve 102, which connects to a second section of the flow control device. In one or more embodiments, re-solidification of the metal insert 108 in the U-shaped portion permanently closes the valve 102.

Figure 5A:
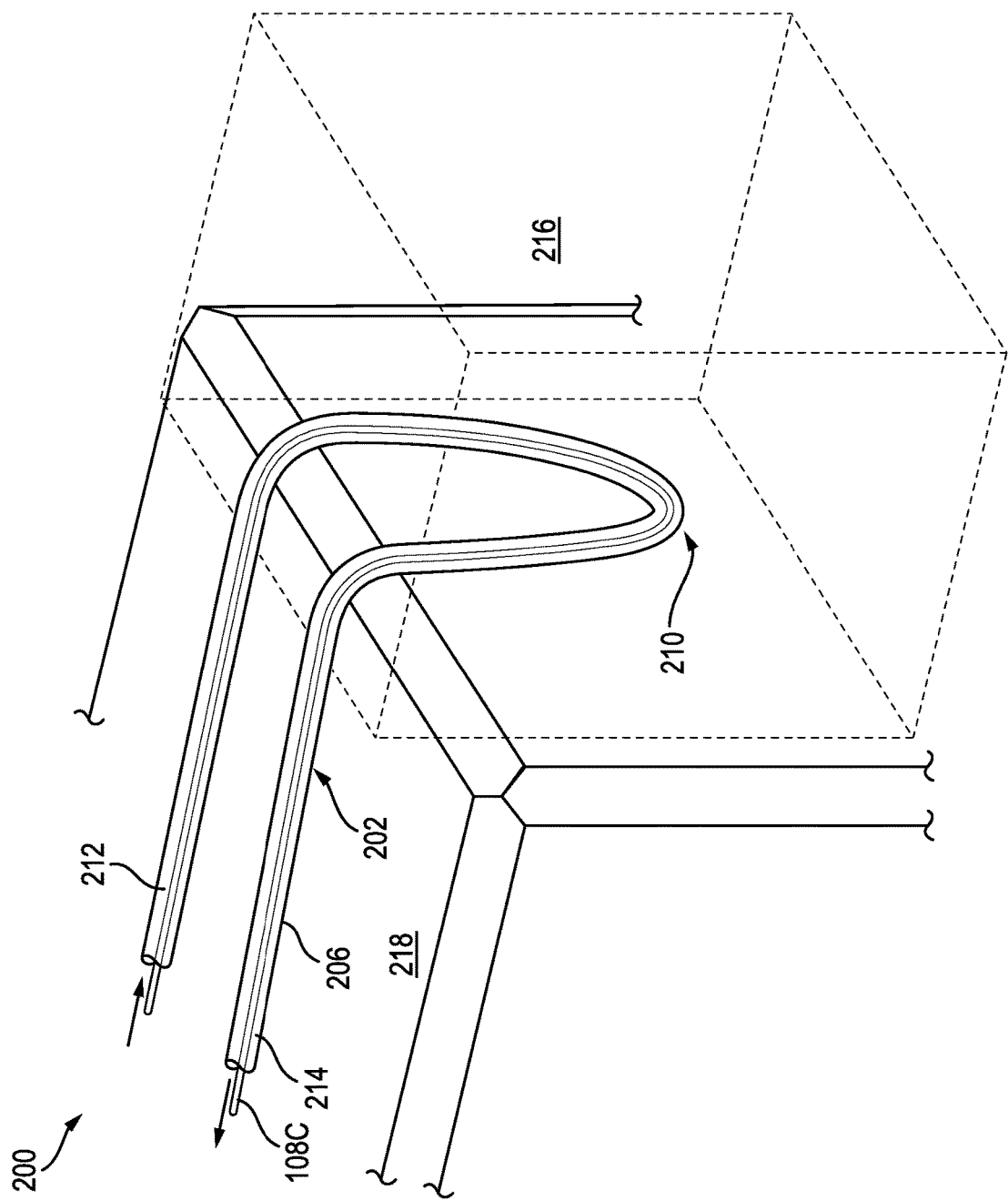
FIGS. 5A-5C show another implementation of the closure mechanism prior to and after activation of the heating device in accordance with one or more embodiments.
Figure 5B:
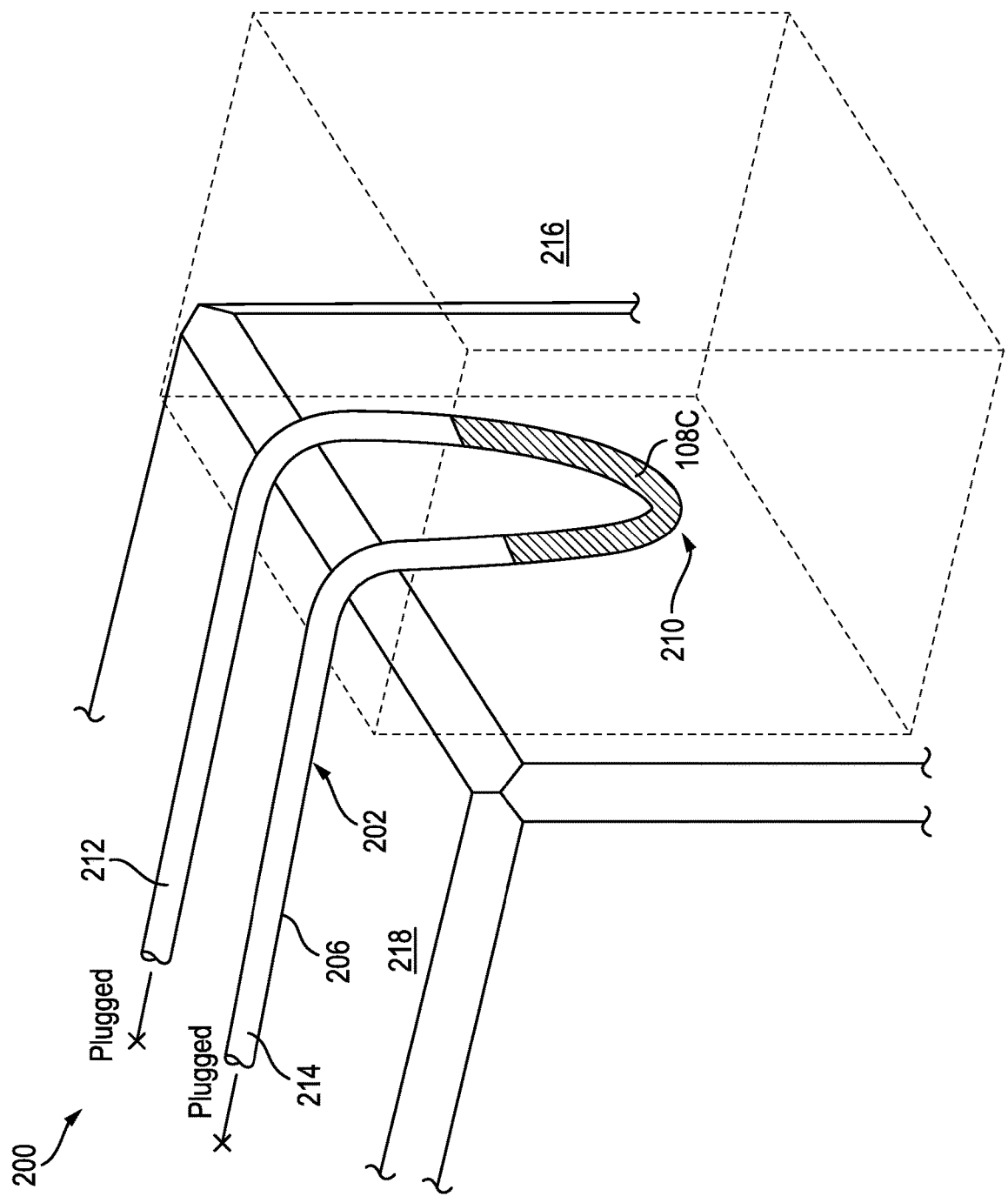
Figure 5C:
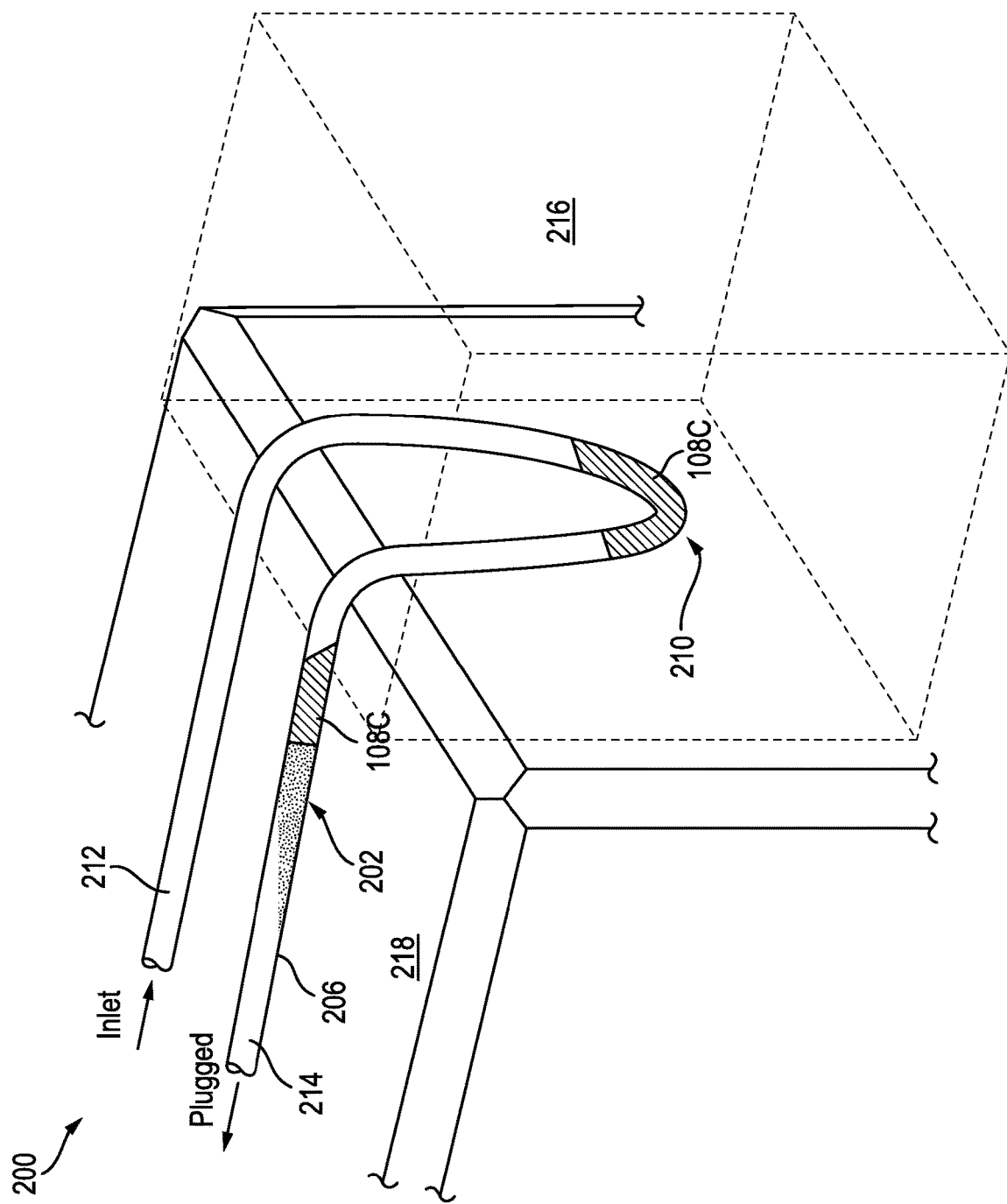

FIGS. 5A-5C show another embodiment of the closure mechanism. As shown in FIG. 5A, this embodiment shows a closure mechanism 200 that has a hollow metal valve 202 that comprises a hollow interior 206, an inlet section 212, and an outlet section 214. In at least one embodiment, the inlet and outlet sections are substantially parallel to one another in a horizontal plane. The metal valve 202 further includes a metal insert 108C in the form of a low-melting-point metal rod (e.g., eutectic metal), such as a cast rod for example. In one or more embodiments, there is no pressure difference between the inlet section 212 and the outlet section 214 (FIG. 5a). In at least one embodiment, there is a pressure differential between the inlet section 212 and the outlet section 214 of the metal valve 202 (FIG. 5C). In an embodiment with a pressure difference between the inlet and outlet sections, if the entire metal valve 202 was located along the horizontal plane (such as in the embodiment of FIG. 4), then when heat is applied to the metal rod, the low-melting point metal would melt and flow completely out of the valve via the outlet 214 instead of collecting in a U-shaped portion of the valve, and thus the valve would not close or plug. Accordingly, the embodiments exemplified in FIGS. 5A-5C provide a solution for instances in which the there is a pressure difference between the inlet and the outlet of the valve. Specifically, the metal valve 202 as exemplified in FIGS. 5A-5C also includes a collection portion 210 connecting the inlet section 212 and the outlet section 214. The collection portion 210 is positioned below the inlet section 212 and the outlet section 214 and along a vertical plane that is substantially perpendicular to the horizontal plane that encompasses the inlet and outlet sections.

Figure 6:
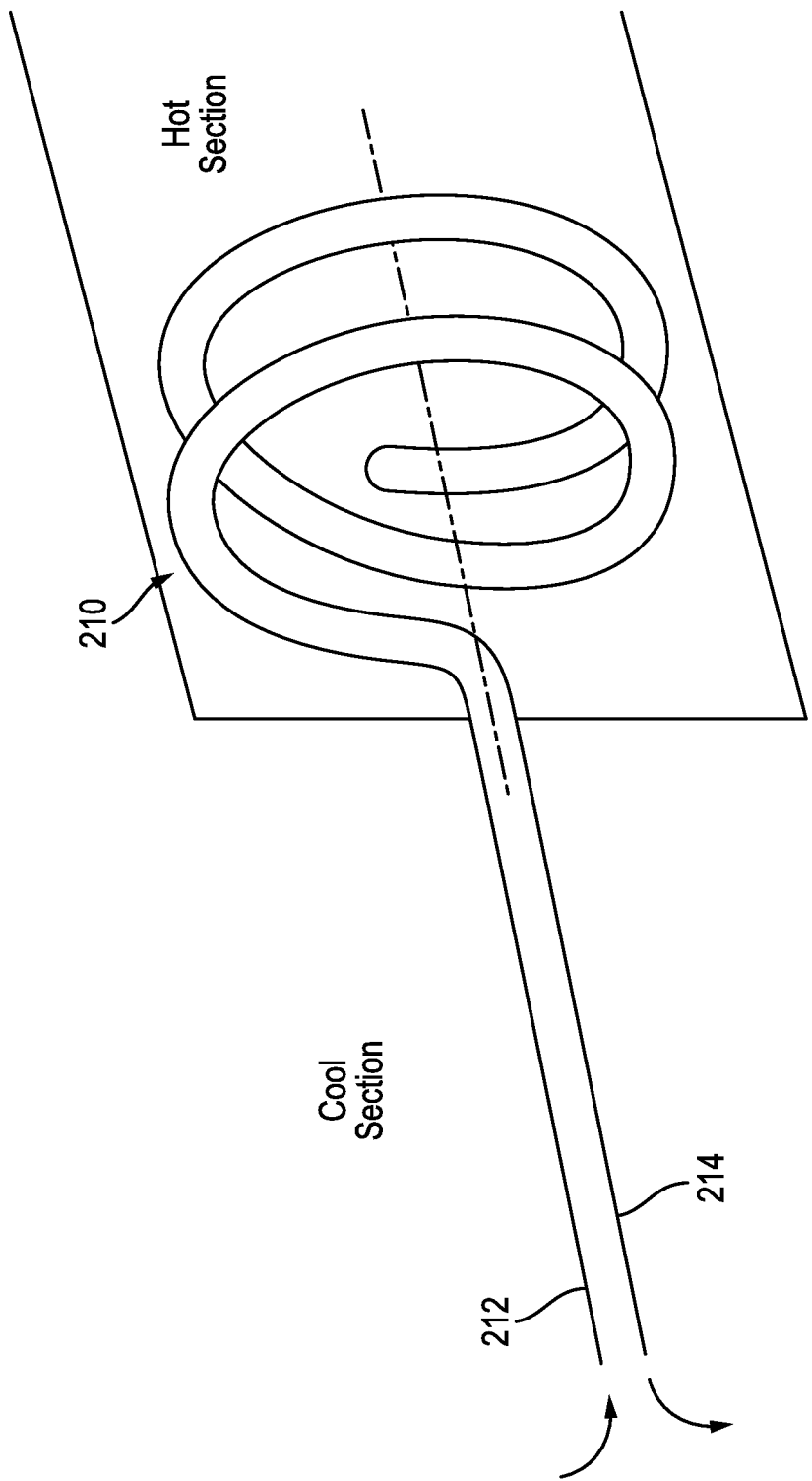
FIG. 6 shows a collection section of the closure mechanism in accordance with one or more embodiments.

In one or more embodiments, the collection portion 210 can be coiled, as shown in FIG. 6 in which the collection portion 210 has at coil that makes at least 2 full turns. This is done, in part, so that the coils do not have to cross, and results in an overall slim design. While the collection portion 210 is shown in FIGS. 5A-5C can be coiled section as shown in FIG. 6, it is shown in FIGS. 5A-5C as a U-shaped portion to more easily display the how the valve 202 is plugged as discussed in further detail below. It is also noted that while the coiled collection portion 210 of FIG. 6 can be used in the embodiment of FIGS. 5A-5C (i.e., the collection portion is in a vertical plane that is perpendicular to the horizontal plane of the inlet and outlet), the coil-shaped collection portion 210 of FIG. 6 can be used in wells of any orientation—vertical, horizontal, deviated, and any rotary orientation about a centerline axis.

With reference again to FIGS. 5A-5C, the collection portion 210 of the valve can be selectively exposed to heat (elevated temperature) from a heater (e.g., thermite heater), while the inlet and outlet sections 212 and 214 are not exposed to the heater. In other words, the collection portion 210 in the vertical plane is in a "hot section" 216 of the well and the inlet and outlet sections 212 and 214 are in a "cool section" 218 of the well, and the heater will only be applied in the "hot section" 216 of the well. For example, the heater can be carefully located in the "hot section" of the well, and the heat radiates from the heater in a radial or concentric direction. There is very little heat transmission from the heater in the axial direction, and thus does not affect the temperature of the "cool sections" of the well. In one or more embodiments, the "cool sections" of the well can be approximately 90° C. in oil wells and approximately 125° C.-165° C. in gas wells. In one or more embodiments, the melting point of the low-melting temperature metal insert 108 is approximately 30° C.-50° C. warmer than the temperature of the "cool sections." However, it should be understood that the particular temperatures of the "cool sections" and "hot section" are specific to the use of the particular well, and thus high or lower temperature ranges may be used for the "cool sections" than provided in the exemplary embodiments above.

The heat emanates through the metal valve 202 at or around the collection portion 210 and the elevated temperature of the valve 202 at that location is sufficient to melt the low-melting temperature metal insert 108C within the collection portion 210, but not high enough to melt the exterior metal of the metal valve 202. As such, the portion of the metal insert 108C located within the collection portion 210 melts into liquid form and flows via gravity towards the lowest point of the collection portion 210 where it collects (FIG. 5B). Again, as long as the heat is not applied to the collection portion and the temperature around to metal insert 108C remains below the melting point of the insert 108C, it will remain stable in a solid state. However, once the metal insert 108C experiences an elevated temperature at or above its melting point, the low-melting point metal will immediately melt, become liquid.

Once the metal insert 108C has been melted, the heater can be deactivated and/or removed from the "hot section" of the well such that the temperature in the collection portion 210 begins to decreases. As shown in FIG. 5B, when there is no pressure differential between the inlet and outlet sections 212 and 214, as the temperature in the collection portion 210 decreases, the melted metal insert 108C cools and re-solidifies in the collection portion 210. Flow between the inlet and outlet sections is also stopped while the metal insert 108C re-solidifies. The re-solidified metal insert 108C plugs the valve 202 at its collection portion 210 and thus closes the valve 202 from flow. By re-solidifying in the collection portion 210, the metal insert 108C effectively shuts off flow between the inlet and outlet sections 212 and 214 of the valve, and thus shuts off the flow of the flow control device (e.g., sad screen, inflow control device) at the site of the valve 202. In one or more embodiments, re-solidification of the metal insert 108C in the collection portion 210 permanently closes the valve 202.

FIG. 5C shows an embodiment of the valve 202 in which there is a pressure difference between the inlet and outlet sections 212 and 214, as well as a pressure difference between the "hot section" and the "cool section." As the metal insert 108C is melted in the "hot section" by the heater, the melted metal insert flows out of the collection portion 210 in the "hot section" of the well and towards the outlet section 214 of the valve 202. The heater can also be removed from the "hot section" at this time. Once the melted metal insert flows out of the "hot section" it re-solidifies in a portion of the outlet section 214 in the "cool section" of the well, thereby plugging the valve 202. Once the melted metal insert 1080 re-solidifies in the outlet section 214, any melted metal insert 108C that remains in the collection portion 210 can re-solidify in the collection portion 210 after the heater is removed. The re-solidification in the collection portion 210 in this embodiment acts as a secondary plug of the valve 202. In one or more implementations, the plug in the outlet section 214 and the secondary plug in the collection portion 210 can be permanent shut-offs for the valve 202.

It should be noted that the valve embodiments of FIG. 5A-5C can be used in wells of any orientation—vertical, horizontal, deviated, and any rotary orientation about a centerline axis. The primary requirement for the embodiments of FIGS. 5A-5C is that the hot and cool sections of the well (in which the valve resides) remain separated from one another such that the cool section is not exposed to the heater.

In one or more embodiments, and as discussed above the closure mechanisms (100, 200) of the present application start in an open position and are closed after the metal insert melts and re-solidifies in the U-shaped portion of the valve. However, in at least one embodiment, the closure mechanisms (100, 200) can be configured to start in a closed position such that the metal insert starts by plugging the U-shaped portion of the valve. In such an embodiment, the metal insert can be heated such that it melts and flows out of the valve due to gravity or pressure differentials between the inlet and outlets section or both. As such, as the melted metal insert flows out of the valve, the valve opens.

Figure 7:
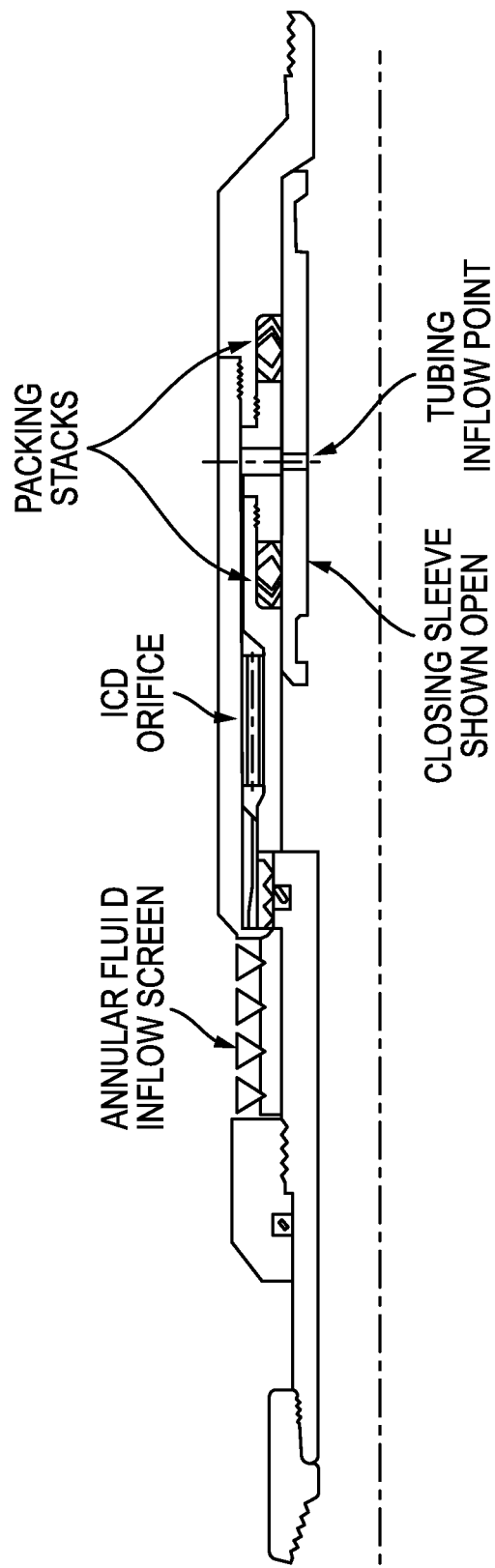
FIG. 7 shows a conventional ICD comprising a shut-off sleeve.

As mentioned above, the closure mechanisms (100, 200) of the present application comprise a shut-off metal valve (102, 202) that can be used with flow control devices (e.g., sand screens, ICDs) in a well. FIG. 7 shows a diagram of a conventional ICD that utilizes a conventional shut-off sleeve for control the flow of fluid. Shut-off sleeves, however, can become fouled with corrosion, scale, asphaltenes, or other contaminants that inhibit its proper operation after many years in the wellbore. The closure mechanism of the present application, on the other hand, does not include any sliding surfaces, and thus does, not become fouled by debris, asphaltenes, paraffins, scale, or corrosion.

Figure 8A:
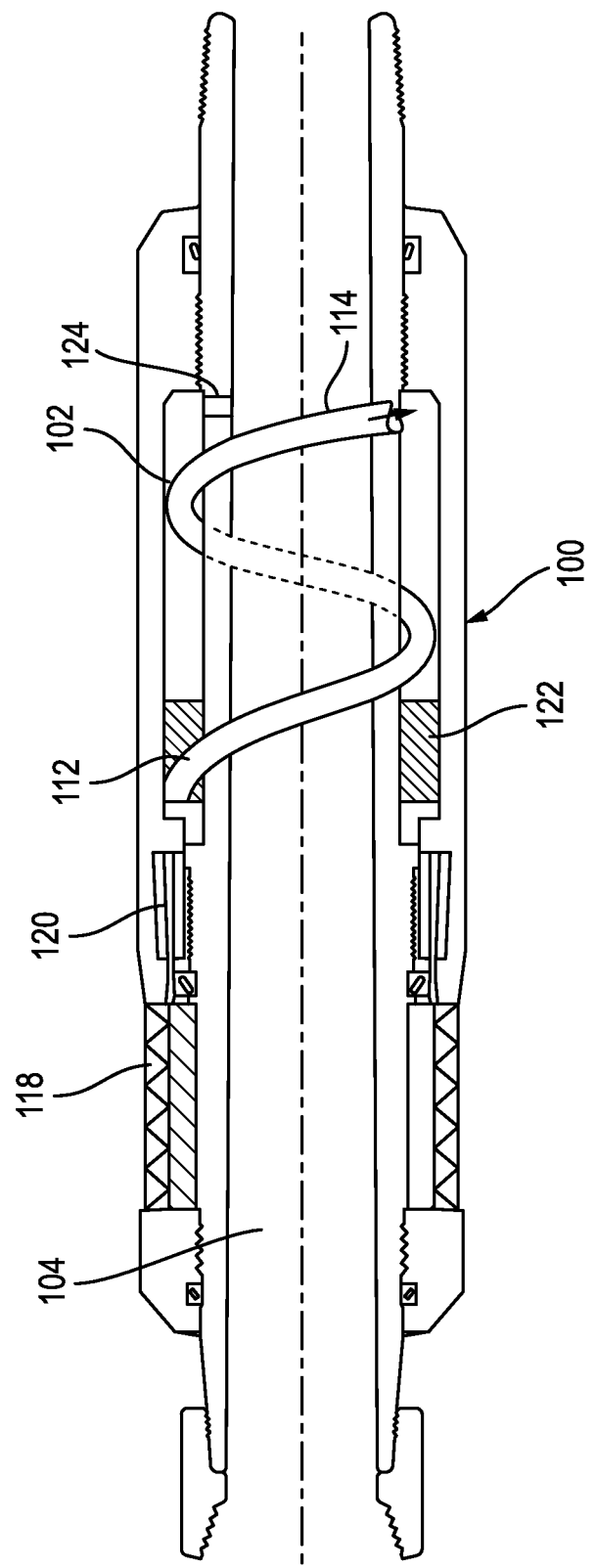
FIGS. 8A-8B show exemplary implementations of an ICD having the closure mechanism in accordance with one or more embodiments.

FIG. 8A shows a diagram of a modified ICD comprising the closure mechanism (100) of FIG. 4 in accordance with one or more embodiments. As shown in FIG. 8A, the modified ICD includes the closure mechanism 100 comprising the metal valve 102 having a coiled tube than can be plugged by applying heat (via a heater) to the U-shaped portion of the valve. In this embodiment, when the valve 102 is open, fluid enters through the screen inflow point 118, flows through the ICD orifice 120, and then enters the valve 102 via the inlet section 112. The valve 102 is coiled (wrapped) 1.5 or more turns around a pipe 104. The coil on the valve 102 is made to compensate for the direction of gravity when at rest. The outlet section 114 of the valve 102 can be attached to a production tubing of the ICD, for example. In this embodiment, a pressure chamber is created, and the valve is sealed (seal shown at 122) as it entered the pressure chamber. A hole 124 is also provided in the hollow pipe 104. As the fluid exits the valve 102, it will flow into the pressure chamber until it reaches the hole 124 in the hollow pipe 104. Ultimately, the fluid flows from outside the ICD to the inside of the ICD. When heat is applied around the U-shaped portion of the valve 102, the melting and re-solidifying of the metal insert in the U-shaped portion closes the valve 102 and thus stops the flow of fluid through the valve 102.

Figure 8B:
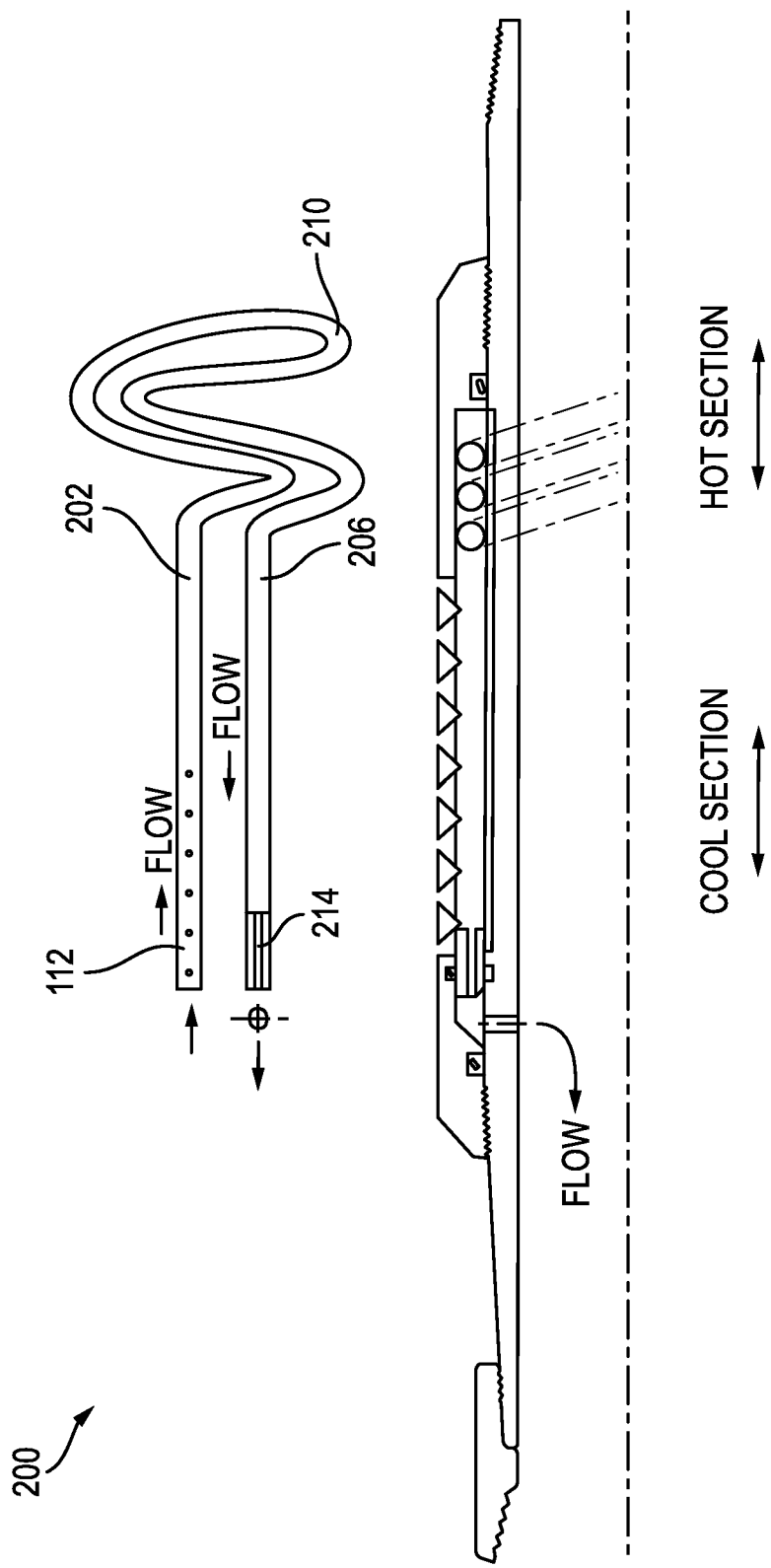

Similarly, FIG. 8B shows a diagram of a modified ICD comprising the closure mechanism (200) of FIGS. 5A-5C and 6 in accordance with one or more embodiments. As shown in FIG. 8B, the modified ICD includes the closure mechanism 200 comprising the valve 202 having inlet 212 and outlet 214 sections located in a "cool section" of the well and a coiled section (collection section 210) located in a "hot section" of the well. This embodiment is similar to the embodiment shown in FIG. 8A, except that in the embodiment of FIG. 8B, the valve 202 is an axial valve that is run under a screen and increases the amount of radial spaced taken up by the closure mechanism, while saving axial space. Upon integration of the valve 202, the inflow of fluid comes through the screen and into multiple tubing inlet holes 212, flows around the coil 210, and out the outlet 214 and into the tubing. As mentioned above, the closure mechanism of FIG. 8B can work in a well of any orientation—whether or not there is a pressure difference between the inlet and outlet—so long as there separated hot and cool sections.

Although much of the foregoing description has been directed to closure mechanism and methods for closing a metal valve, the mechanisms and methods disclosed herein can be similarly deployed and/or implemented in scenarios, situations, and settings far beyond the referenced scenarios. For example, other types of flow control devices besides hydrocarbon sand screens and ICDs can also be utilized with the present closure mechanisms and methods. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. A closure mechanism for plugging a flow control device of a well, the closure mechanism comprising:
   a valve in fluid communication with a portion of the flow control device, wherein the valve has a hollow interior and a U-shaped portion;
   a metal insert located within a portion of the hollow interior of the valve; and
   a heating device positioned within the well; and
   a hollow pipe of the flow control device or the well, wherein at least a portion of the valve is a coil-shaped tube configured to wrap around the hollow pipe,
   wherein activation of the heating device melts at least a portion of the metal insert, and wherein the melted portion of the metal insert collects and re-solidifies within the U-shaped portion of the valve, thereby closing the valve and plugging the flow control device against flow.

2. The closure mechanism of claim 1, wherein the hollow pipe has a horizontal orientation and the coil-shaped tube of the valve is coiled at least 1.5 turns around the hollow pipe.

3. The closure mechanism of claim 1, wherein the heating device is a thermite heater.

4. The closure mechanism of claim 1, wherein the metal insert is a eutectic metal insert and the valve is comprised of metal having a higher melting temperature than the eutectic metal insert.

5. The closure mechanism of claim 1, wherein the metal insert is a metal rod.

6. The closure mechanism of claim 1, wherein the metal insert is a metal lining that is coated on a lower portion of the hollow interior of the valve.

7. A method for plugging a flow control device of a well, wherein the flow control device is in fluid communication with a switch, and the switch has a hollow interior with a metal insert and a U-shaped section, the method comprising:
    positioning a heating device in the well;
    activating the heating device, wherein the activated heating device melts a portion of the metal insert inside the switch; and
    collecting, the melted portion of the metal insert in the U-shaped section of the switch, wherein the melted portion of the metal insert re-solidifies in the U-shaped portion of the switch, thereby closing the switch, and plugging the flow control device against flow.

8. The method of claim 7, further comprising:
    wrapping at least a portion of the switch around a hollow pipe of the well, wherein the portion of the switch is wrapped at least 1.5 turns around the hollow pipe to form a coil-shaped section, and wherein the coil-shaped section comprises the U-shaped portion.

9. The method of claim 8, wherein the switch is a valve comprising metal, and the metal insert is a eutectic metal insert.

10. The method of claim 9, wherein the step of positioning the heating device in the well comprises positioning the heating device into the hollow pipe at a location that is adjacent to the coil-shaped section, and
    wherein the step of activating the heating device comprises heating the coil-shaped section to a temperature such that the portion of the metal insert melts but the metal of the valve does not melt.

11. A closure mechanism for plugging a flow control device of a well, the closure mechanism comprising:
    a valve having a hollow interior and in fluid communication with a portion of the flow control device, wherein the valve comprises:
        an inlet section,
        an outlet section,
        a collection section connecting the inlet and outlet sections, wherein the collection section is positioned below the inlet and outlet sections, and
        a metal insert that lines at least a portion of the hollow interior of the valve;
    a hollow pipe of the flow control device or the well, wherein at least a portion of the valve is a coil-shaped tube configured to wrap around the hollow pipe; and
    a heating device that is positioned adjacent to the collection section, wherein activation of the heating device melts the metal insert, and wherein at least a first portion of the melted metal insert collects and re-solidifies in the collection section thereby closing the valve and plugging the flow control device against flow.

12. The closure mechanism of claim 11, wherein the metal insert is a eutectic metal insert and the valve is comprised of metal having a higher melting temperature than the eutectic metal insert.

13. The closure mechanism of claim 11, wherein the metal insert is a metal rod or a metal lining that is coated on at least a lower portion of the hollow interior of the valve.

14. The closure mechanism of claim 11, wherein the collection section is a U-tube shaped section or a coil-shaped section.

15. The closure mechanism of claim 11, wherein a second portion of the melted metal insert collects and re-solidifies in the outlet section due to a pressure difference between the inlet section and the outlet section.

16. The closure mechanism of claim 11, wherein the heating device remains separated from the inlet and outlet sections.

17. The closure mechanism of claim 11, wherein the inlet and outlet sections are positioned along a horizontal plane and the collection portion is positioned along a vertical plane that is substantially perpendicular to the horizontal plane.

* * * * *